United States Patent [19]

Hargraves

[11] 4,125,278

[45] Nov. 14, 1978

[54] PLUG-IN CONNECTOR

[76] Inventor: Donald E. Hargraves, 54 Harbor St., Pepperell, Mass. 01463

[21] Appl. No.: 802,180

[22] Filed: May 31, 1977

[51] Int. Cl.² .............................................. F16L 3/00
[52] U.S. Cl. ................................ 285/61; 285/332.3; 285/345; 285/137 R; 285/423
[58] Field of Search ............... 285/325, 326, 327, 421, 285/328, 332, 332.2, 61, 62, 63, 64, 423, 345, 332.3, 137 R; 248/54 R

[56] References Cited

U.S. PATENT DOCUMENTS

| | | | |
|---|---|---|---|
| 1,985,963 | 1/1935 | Walker | 285/325 X |
| 2,617,534 | 11/1952 | Henry | 285/61 X |
| 3,345,088 | 10/1967 | Nagle | 285/421 X |
| 3,999,784 | 12/1976 | Kennedy | 248/54 R |

Primary Examiner—Dave W. Arola
Attorney, Agent, or Firm—Wolf, Greenfield & Sacks

[57] ABSTRACT

A plug-in connector to couple pneumatic, hydraulic, or vacuum lines to elements mounted on a printed circuit board is described. The connector employs a wedge shaped male unit that plugs into a female unit having a cut-out which receives the wedge shaped male member. The mated male and female units of the connector provide an intermediate passage that is normal to and connects with the inlet and outlet passages whereby the forces on the connector are such that no fasteners are needed to keep the mated parts from separating.

3 Claims, 9 Drawing Figures

PLUG-IN CONNECTOR

FIELD OF THE INVENTION

This invention relates in general to couplers of the kind for connecting pneumatic, hydraulic, or vacuum lines. More particularly, the invention pertains to plug-in connectors that can be used in conjunction with printed circuit boards to enable pneumatic, hydraulic, and vacuum line connections to be made at the same times that the electrical connections are made to the board.

BACKGROUND OF THE INVENTION

Technological advances in areas such as medical electronics, electronic instrumentation, and industrial controls have created a need for hydraulic, pneumatic and vacuum line mechanisms that are compatible with electronic components. In the past, hydraulic, pneumatic and vacuum devices have been large and bulky and have tended to be incompatible both as to size and operation with electronic components. For many applications that have arisen in recent times, hydraulic, pneumatic, and vacuum mechanism have been reduced in size to enable those devices to be mounted, together with electronic components, on printed circuit boards. Where rigid tubing is employed to make connections to the hydraulic, pneumatic, and vacuum devices on the printed circuit board, the rigid lines prevent the easy removal and installation of the board. Where flexible tubing is used, the flexible tubes must be individually connected to the hydraulic, pneumatic or vacuum devices when the board is installed and plugged in to its electrical connector. As a corollary, those tubes must be disconnected when it is desired to remove the printed circuit board. Consequently, space must be provided in the rack or cabinet housing the printed circuit board to permit those connections and disconnections to be made. Further, there is a danger that the flexible tubing may be incorrectly connected where there are many tubes to be connected to devices on the board.

OBJECTS OF THE INVENTION

The primary object of the invention is to provide mechanical coupling devices that can be mounted on a printed circuit board so that when the board is plugged in to make its electrical connections, the pneumatic, vacuum, and hydraulic line connections are made at the same time by the mechanical connectors. A further object of the invention is to conserve space by enabling the pneumatic, vacuum, and hydraulic mechanisms on the board to be connected to the mechanical coupling devices on the board before the board is installed in its cabinet or rack. Where access to the mechanisms on the board is wanted, the coupling devices of the invention enable the easy removal of the board by simply pulling the board away from the mated electrical and mechanical connectors mounted on the cabinet or rack. Another object of the invention is to provide a plug-in connector that does not require fasteners to hold the mated parts together.

DETAILED DESCRIPTION OF THE PREFERRED EMBODIMENTS

Figure 1:
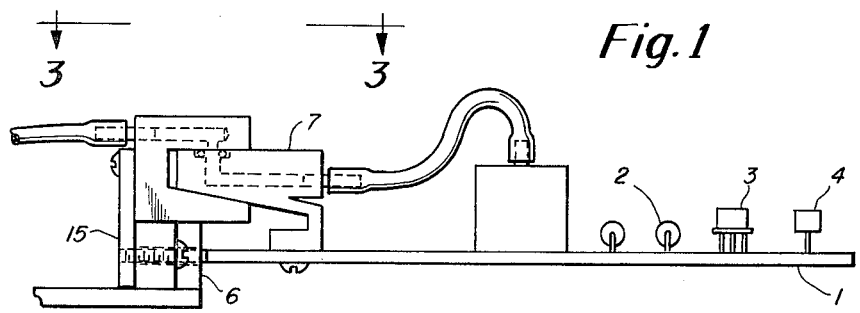
FIG. 1 shows the invention used with a printed circuit board of the type carrying both electrical and pneumatic components and having electrical and pneumatic connectors plugged into mating receptacles mounted on a bracket forming part of a support such as a rack or cabinet.
Figure 2:
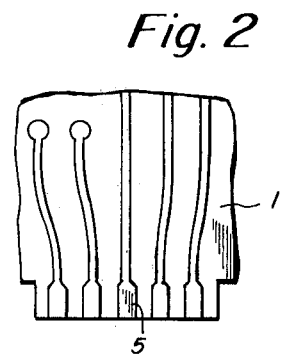
FIG. 2 depicts the conventional type of edge connectors used on printed circuit boards to mate with conventional multi-connector electrical receptacles.

FIG. 1 of the drawings depicts a printed circuit board 1 of the type having electrical components 2, 3, and 4 mounted in the conventional manner on the board by having their electrical leads projecting through holes in the board and soldered on the opposite side to electrical conductors, usually of copper foil, clad on the board. In the manner of conventional printed circuit boards, one edge of the board, as shown in FIG. 2 has exposed electrical terminals 5 to enable electrical connections to be made to the components on the board by plugging that edge into a printed circuit board edge connector 6. The plug-in edge connector 6 can be of the commercially available type such as the Prin-Cir made by Amphenol or the Edge-On made by Burndy.

Figure 3:
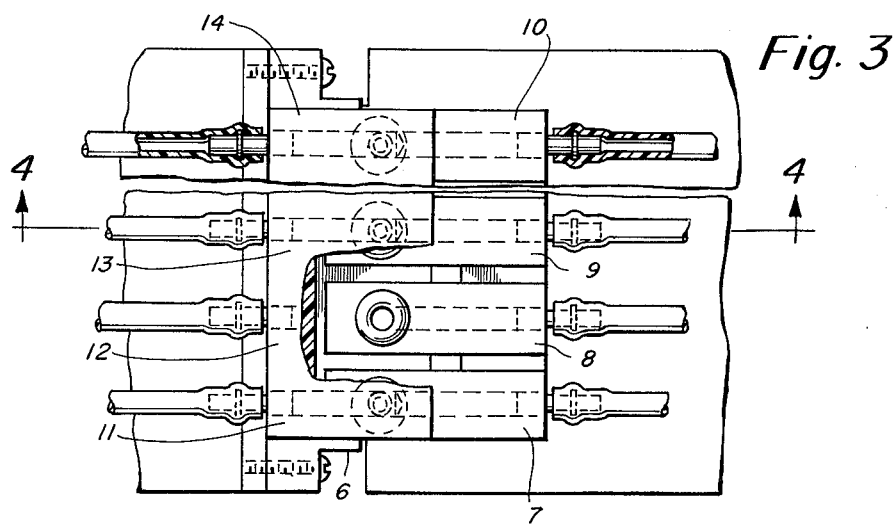
FIG. 3 is an enlarged top view taken along the plane 3—3 of FIG. 1 and shows a portion of the arrangement depicted in FIG. 1 with parts broken away to expose the underlying male connector unit.

Mounted on the board, as shown in FIG. 3, are pneumatic line connectors 7, 8, 9, and 10 which are constructed in accordance with the invention. The mating units 11, 12, 13, and 14 of the connectors can be mounted, as shown in FIG. 1, over the plug-in edge connector 6 to permit both electrical and pneumatic line connections to be made simultaneously when the board is plugged in.

For ease of exposition, connectors 7, 8, 9, and 10 are termed "male" units and the mating devices 11, 12 13, and 14 are termed "female" units. While those connectors are herein described as being employed to connect pneumatic lines, the connectors can also be employed to connect vacuum lines or hydraulic lines. Where used as hydraulic line connectors, the hydraulic fluid should be bled off before the male connector is separated from the female connector.

In FIG. 1, the female units are secured by screws to a bracket 15 which can be part of a cabinet or rack for housing printed circuit boards. The printed circuit board edge connector 6 can also be secured by fasteners to that same bracket.

Figure 4:
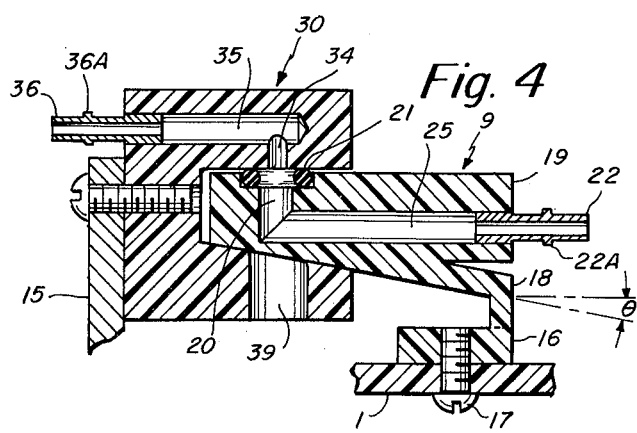
FIG. 4 is a view taken along the plane 4—4 of FIG. 3 and depicts the mated male and female units of the preferred embodiment of the invention.

A cross-section of the male and female units of a connector taken along the plane 4—4 of FIG. 3 is depicted in FIG. 4. The male unit 9 has a foot 16 that is provided with a hole for accepting a screw 17 to enable the unit to be secured to the printed circuit board 1. Supported upon the foot by a lateral wall 18 is the body 19 of the unit. That body extends forwardly form the lateral wall and the bottom surface of the body is inclined at an angle θ, relative to its flat upper surface so that the body is essentially wedge-shaped. Preferably, angle θ is about 10° but that angle is not critical and will depend to some extent upon the material of which the connector is made. A transverse passage 20, formed in the body 19 adjacent the narrow end of the wedge-shaped body has a port 20A with an enlarged opening in which an O-ring 21 is received in a manner that causes the O-ring to protrude above the rim of the port when the male unit is separated from the female unit of the connector. The opposite end of transverse passage 20 is connected to a passage 25 extending longitudinally in the body toward the wide end of the wedge. Protruding from the passage 25 at the wide end of the wedge is a pipe 22 which has one end secured in the passage. The pipe is depicted as having a barb collar 22A to enable a flexible tube to be inserted over the pipe and held in place without the need for hose clamps. The flexible tube is preferably of a resilient material that expands slightly when it is inserted over the pipe. The barb collar 22A makes it difficult to pull the flexible tubing off the pipe because the collar tends to bite into the tubing and prevent the tubing from being pulled off the pipe. Passage 25 as depicted in FIG. 4, extends horizontally toward port 20A. The port 20A is consequently at the top of the body and near the front of the wedge.

Figure 5:
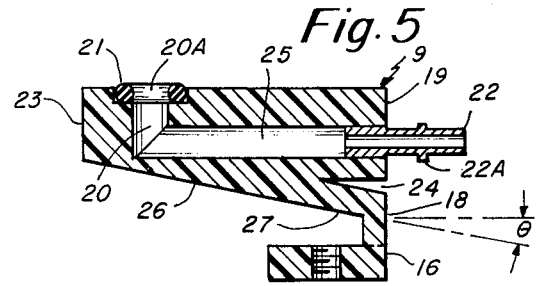
FIG. 5 depicts the preferred embodiment of the male unit of the invention.

As shown in FIG. 5, the wedge does not come to a point at its front end but rather is truncated to have a blunt front face 23. To permit the wedge to flex when it is plugged into the female unit, a triangular cut 24 is made in the rear face to form a thin section 27 extending forwardly from the lateral wall 18. Consequently, when the male unit is plugged into the female unit as depicted in FIG. 4, the body 19 is effectively hinged on the lateral wall so that the inclined bottom surface of the body 19 is able to rise up on an inclined surface of the female unit.

Figure 6:
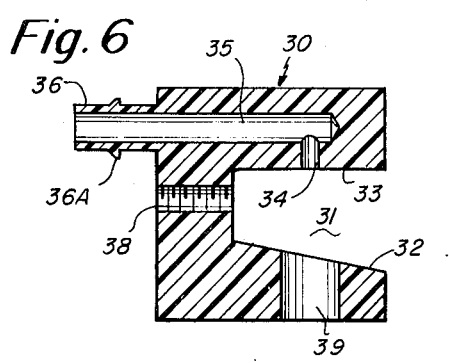
FIG. 6 depicts the preferred embodiment of the female unit of the invention.

Referring now to FIG. 6, the female unit 30 has a truncated triangular cut-out 31 configured to receive the wedge shaped body 19 of the male unit. As the male unit advances into the female unit the inclined bottom surface 26 of body 19 rides upon the ramp 32 of the female unit and in doing so causes the O-ring 21 to seat against face 33 with the port 20A of the male unit in alignment with the passage 34 of the female unit. At its upper end, passage 34 is connected to a passage 35 that extends normally to the passage 34. Protruding from the forward end of passage 35 is a pipe 36 which has a barb collar 36A to enable a flexible tube to be slipped over the tube and held in place without the need for hose clamps. To enable the female unit to be secured to the bracket 15, a threaded hole 38 is provided to receive a screw 37 (FIG. 4). An opening 39 in the female unit is provided to enable the passage 34 to be formed by a tool that extends through that opening. The female unit can be modified as shown in FIG. 6 to have the pipe 36 formed as an integral part of the unit.

The female unit can be made of a rigid, inelastic material if desired because the required flexure can be provided entirely by the male unit. Preferably, however, both the male and female units are made of a material such as Delrin which is relatively unaffected by most hydraulic fluids.

Figure 7:
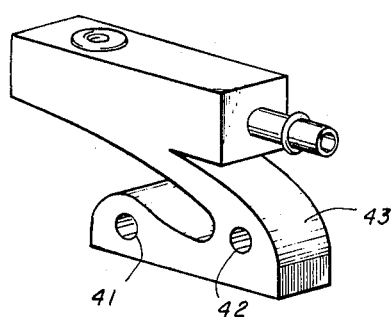
FIGS. 7 and 8 illustrate the manner in which the male unit is constructed to enable multiples of those units to be plugged together to form a multiple connector strip.
Figure 8:
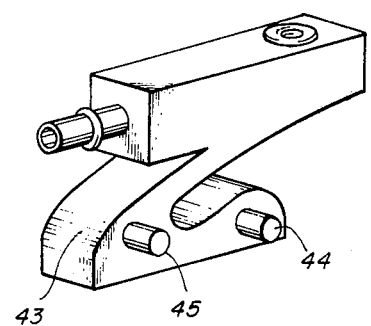

To enable units to be assembled into multiples, the male units can be constructed as shown in FIGS. 7 and 8 to interlock one with another. As shown in those drawings, the male unit 40 on one side has two openings 41 and 42 in its foot 43 and on the other side the foot has projecting members 44 and 45. When male units are disposed side by side, the projecting members of one unit can be snapped into the openings of the adjacent unit to lock the units together. In that manner, multiple units can be locked together or disengaged, as needed. The female units can be formed to snap together in the same way.

Figure 9:
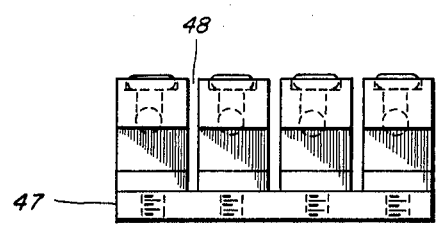
FIG. 9 illustrates multiple male units integral with a common base and forming a multiple connector strip.

Instead of forming the units to be snapped together to form multiple connectors, the male units can, as depicted in FIG. 9, be integrally joined to a common base 47 which forms the foot for each unit. To enable individual male units to flex when inserted into the female connectors, the bodies of the male units are separated by cuts 48 that extend down to the base 47. When the female units are integrally formed in a strip, similar cuts are not needed to separate the individual female units inasmuch as those units can be rigid over the entire length of the strip.

Referring again to FIG. 4, no fasteners to hold the parts in their mated positions are shown because none are needed. That there is no need for fasteners to hold the male and female units together can be appreciated from an analysis of the forces acting on those members. Assuming the connectors are used in a system under pneumatic or hydraulic pressure and that flexible tubing is used, the forces acting horizontally along passages 25 and 35 tend to push the male and female unit more firmly together while the forces acting vertically tend to separate those units by pushing the male unit more firmly against the ramp 32 (FIG. 6) of the female unit. Inasmuch as the ramp has a small incline, the horizontal component of the vertical force acting along the ramp tends to move the two units apart but that component is more than offset by the horizontal forces urging the units together.

Where the connectors are used in a vacuum system, the suction tends to lift the male unit so that its upper surface is flat against face 33 (FIG. 6) of the female unit. Although the forces acting horizontally along passages 25 and 35 tend to separate the two units, those horizontal forces are unable to move the members apart because the horizontal forces cannot overcome the frictional forces preventing the male unit from sliding along the face 33 of the female unit.

It can be appreciated, therefore, that whether used in a pressurized system or in a vacuum system, the connectors will remain mated without the need for fasteners to hold the mated parts together.

The best mode contemplated by the inventor for carrying out his invention is described in the foregoing specification. It is, however, apparent that the illustrated embodiments can be modified in various ways and that the invention can be embodied in other forms. It is not intended therefore that the invention be restricted to the precise embodiments depicted or described. Rather, it is intended that the invention be delimited by the appended claims and include those connectors that do not fairly depart from the essence of the invention.

I claim:

1. A plug-in connector comprising
  (1) a male unit having an elongate wedge shaped body connected to a base by means supporting the body while permitting the body to flex toward and away from the base, the base being adapted for attachment to a support, the body having a longitudinal passage in it extending from the wide end of the wedge toward the narrow end, the end of the longitudinal passage at the wide end of the wedge terminating in means for accommodating an external connection to that passage, a transverse passage in the body adjacent the narrow end of the wedge, the transverse passage terminating at one end in a port at the body's surface, the transverse passage being normal to the longitudinal passage and connected to it, (2) a female unit having a cut-out extending from a surface of said female unit and terminating at an interior part of said female unit shaped to receive the wedge shaped body of the male unit, the cut-out having ramp means for causing the male unit to more firmly mate with the female unit as the wedge shaped body of the male unit progresses into the cut-out, the female unit having a longitudinal passage terminated in means for accommodating an external connection to that passage, a transverse passage in the female unit normal to the longitudinal passage therein, the transverse passage being connected to the longitudinal passage in the female unit and terminating at the surface of the female unit in a port situated to align with the port of the transverse passage in the male unit when the male and female units are mated, and (3) sealing means carried by at least one of the units for sealing the aligned ports when the male and female units are mated.

2. The plug-in connector according to claim 1 wherein the sealing means is an O-ring disposed around the port of the transverse passage of one of the units whereby the O-ring is compressed when the units are mated.

3. The plug-in connector according to claim 1, wherein the aforesaid means for accommodating an external connection is a protruding pipe having a barb collar.

* * * * *